(12) United States Patent
Stoffels et al.

(10) Patent No.: US 8,147,377 B2
(45) Date of Patent: Apr. 3, 2012

(54) CONTROL STRATEGY FOR MULTI-MODE VEHICLE PROPULSION SYSTEM

(75) Inventors: Harald Stoffels, Cologne (DE); Klemens Grieser, Langenfeld (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/048,761

(22) Filed: Mar. 15, 2011

(65) Prior Publication Data

US 2011/0165993 A1      Jul. 7, 2011

Related U.S. Application Data

(62) Division of application No. 11/734,645, filed on Apr. 12, 2007, now Pat. No. 7,918,763.

(51) Int. Cl.
*B60W 10/06* (2006.01)

(52) U.S. Cl. ...................................................... 477/107

(58) Field of Classification Search .................... None
See application file for complete search history.

(56) References Cited

U.S. PATENT DOCUMENTS

| | | | |
|---|---|---|---|
| 6,266,597 B1 * | 7/2001 | Russell et al. | 701/54 |
| 6,602,164 B2 | 8/2003 | Yoshiaki et al. | |
| 6,629,025 B2 | 9/2003 | Evans et al. | |
| 6,932,175 B2 | 8/2005 | Teraji et al. | |
| 2004/0050363 A1 | 3/2004 | Yamaoka et al. | |
| 2005/0054482 A1 | 3/2005 | Doering et al. | |
| 2005/0101433 A1 | 5/2005 | Joe | |
| 2005/0247503 A1 | 11/2005 | Imazu | |

* cited by examiner

*Primary Examiner* — David D Le
*Assistant Examiner* — Erin D Bishop
(74) *Attorney, Agent, or Firm* — Allan J. Lippa; Alleman Hall McCoy Russell & Tuttle LLP

(57) ABSTRACT

A method for controlling a vehicle operation in the transmission lash region. One method includes transitioning a combustion mode of a cylinder, and varying a timing of said transition responsive to whether the transmission is operating within the lash region of the transmission.

8 Claims, 7 Drawing Sheets

CONTROL STRATEGY FOR MULTI-MODE VEHICLE PROPULSION SYSTEM

CROSS REFERENCE TO RELATED APPLICATIONS

The present application is a divisional of U.S. patent application Ser. No. 11/734,645 filed Apr. 12, 2007, the entire contents of which are incorporated herein by reference.

BACKGROUND AND SUMMARY

Internal combustion engines may be controlled in a variety of ways to provide acceptable driving comfort across a range of operating conditions while still meeting the performance demands of the driver. Some engines may utilize two or more modes of operation to achieve improved drivability and performance. As one example, one or more cylinders of an engine may transition between a spark ignition mode and a homogeneous charge compression ignition mode based, for example, on the amount of torque requested by the driver. As another example, engine output may be coordinated with the selective use of a secondary motor to achieve improved efficiency, drivability, and performance, such as is the case with a hybrid propulsion vehicle system.

However, during some conditions, the torque produced by the engine and/or motor may change rapidly due to a mode transition or a change in the vehicle performance requested by the driver. For example, if a rapid increase in engine torque occurs within a lash region of the transmission or other system of the vehicle driveline, noise and vibration harshness (NVH) or "clunk" may occur. In some cases, this clunk may be perceived by the driver where the transmission is transitioned too rapidly between a positive and negative torque transfer. As one example, a transition of one or more engine cylinders between combustion modes may cause a temporary torque transient that may increase the likelihood of clunk if the transition is performed within or near the lash region. Similarly, the addition and subtraction of torque from the driveline via a secondary motor may increase the likelihood of clunk where the transmission is operated near or within the lash region.

In one approach described herein, some of the above issues may be addressed by a vehicle control method for a vehicle including an internal combustion engine and an electric motor coupled to a torque converter, the torque converter having a speed ratio from torque converter output speed to torque converter input speed, the torque converter coupled to a drive wheel of the vehicle by a transmission, the method comprising selecting a rate of change limit based at least on a speed ratio across said torque converter input and output speeds; and adjusting an operating parameter of at least one of the engine and the electric motor to control a change in a combined output of the engine and electric motor to be less than said rate of change limit. In this way, by controlling the operation of the engine and/or motor, clunk can be reduced.

In another approach also described herein, some of the above issues may be addressed by a method for controlling a propulsion system for a vehicle including a transmission coupling an output shaft of the internal combustion engine to a drive wheel of the vehicle, wherein said transmission includes a lash region, the method comprising: adjusting an operating parameter of the engine so that at least one cylinder of the engine is transitioned between a first combustion mode and a second combustion mode; and varying a timing of said transition responsive to the lash region of the transmission. In this way, engine mode transitions may be scheduled in response to the operating state of the transmission, particularly the lash region of the transmission, so that clunk may be reduced.

DETAILED DESCRIPTION

Figure 1:
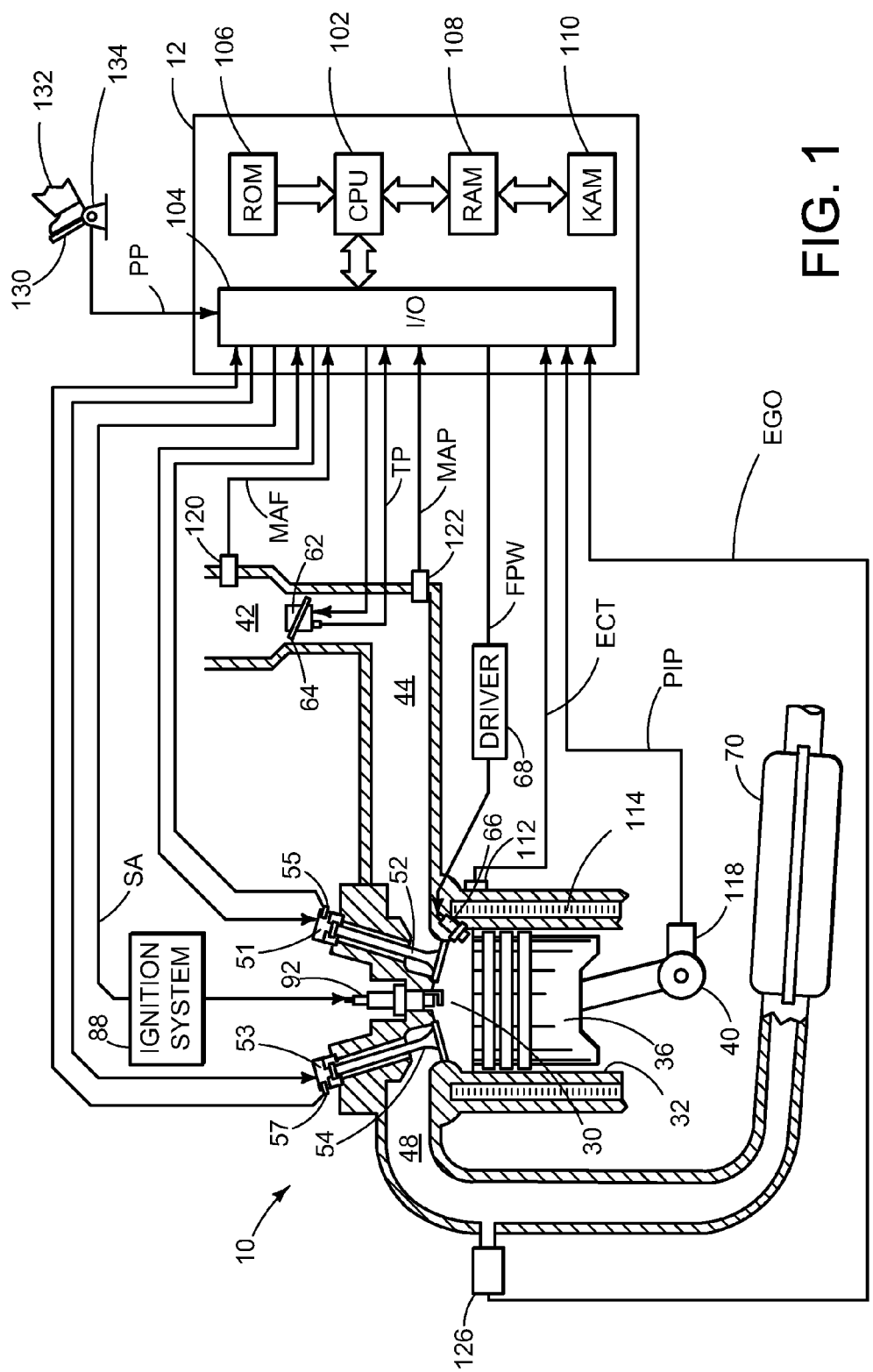
FIG. 1 illustrates a partial engine view of an example engine system.
Figure 2:
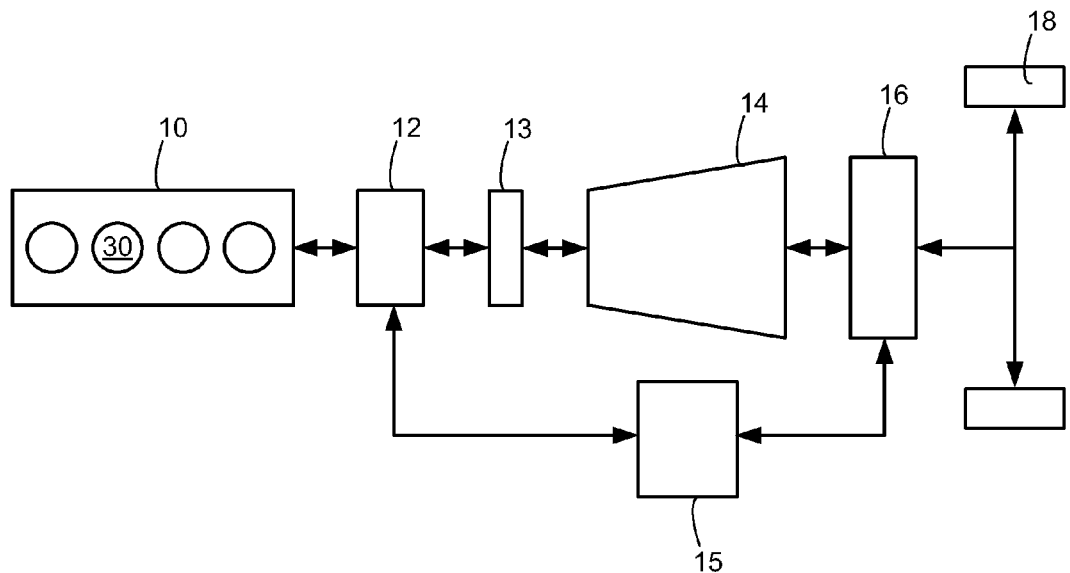
FIG. 2 illustrates an example propulsion system for a vehicle.

Referring now to FIGS. 1 and 2, a propulsion system for a vehicle is described. FIG. 2 illustrates a hybrid propulsion system including one or more of an internal combustion engine 10 having one or more cylinders 30, a transmission 14, a drive wheel 18, and one or more motors 12 and/or 16. In some embodiments, the driveline may include a torque converter 13 arranged between the engine and the transmission. Motors 12 and/or 16 may be powered by an energy storage device 15 or may transmit energy to device 15 where it may be stored for later use. As will be described in greater detail, these components may be controlled to enable the vehicle to be propelled by at least one of the engine or motor. While FIG. 2 illustrates two separate motors 12 and 16, it should be appreciated that one or more of these motors may not be included in some embodiments of the propulsion system as will be described below in greater detail.

Torque converter 13 may be coupled to the engine and/or motor via a crank shaft and may be coupled to transmission 14 via a turbine shaft. Torque converter 13 may include a bypass clutch, which can be engaged, disengaged, or partially engaged. When the clutch is either disengaged or partially engaged, the torque converter is said to be in an unlocked state. In some embodiments, a ratio of input speed of the torque converter to output speed of the torque converter may be used to identify a condition of the transmission. For example, the engine and/or motor may be controlled in response to the torque converter speed ratio to avoid or reduce torque transients through the transmission lash regions. The turbine shaft is also known as transmission input shaft. Transmission 14 may include an electronically controlled transmission with a plurality of selectable gear ratios. Transmission 14 may also include various other gears, such as, for example, a final drive ratio.

With regards to a full series type hybrid propulsion system, the engine may be operated to generate a form of energy suitable for use by the one or more motors. For example, with a full series type hybrid electric vehicle (HEV), the engine may generate electricity via a motor/generator that may be used to power an electric motor for propelling the vehicle. As another example, an engine may be operated to provide pump work to a hydraulic or pneumatic system that may be used to power a hydraulic or pneumatic motor for propelling the vehicle. As yet another example, an engine may be operated to provide kinetic energy to a flywheel or similar device for later application at the drive wheels.

With regards to a parallel type hybrid propulsion system, the engine and one or more motors may be operated independently of each other. As one example, an engine may be operated to provide torque to the drive wheels, while a motor (e.g. electric, hydraulic, etc.) may be selectively operated to exchange torque with the driveline, for example, by adding or removing torque. As another example, the engine may be operated without the motor or the motor may be operated without the engine.

Further, with either series or parallel type propulsion systems, or combinations thereof, an energy storage device such as device 15 may be included to enable energy generated by the engine and/or motor to be stored for later use by one or more of motors. For example, a regenerative braking operation may be performed, where a motor/generator is used to convert kinetic energy at the drive wheels to a form of energy suitable for storage at the energy storage device. For example, with regards to a HEV, the motor or a separate generator may be used to convert torque at the wheels or torque produced by the engine into electrical energy that may be stored at the energy storage device. A similar approach may be applied to other types of hybrid propulsion systems including hydraulic, pneumatic, or those including flywheels.

FIG. 2, for example, illustrates a motor 12 arranged between engine 10 and transmission 14. In this example, motor 12 may be operated to provide torque to the engine (e.g. during a cranking operation) or receive torque from the engine (e.g. during an energy conversion operation). Further, some or all of the torque produced by engine 10 may bypass or pass through motor 12 to transmission 14 where it may be delivered to the drive wheels. Regenerative braking may be achieved with motor 12, at least in some embodiments (e.g. where motor 16 is not included), by transmitting torque from the drive wheels to motor 12 via the transmission, where motor 12 can perform a generator function or alternatively a separate generator may be included.

FIG. 2, further illustrates an alternative hybrid configuration where a motor 16 is arranged between the transmission and drive wheels with or without the inclusion of motor 12. In this example, motor 16 may be operated to provide torque to the drive wheels in addition to or exclusive of engine 10. Regenerative braking may be provided by motor 16 or by a separate generator. Torque may be provided to the engine via transmission 14 or engine 10 may include a separate starter/alternator to facilitate cranking or start-up of the engine.

FIG. 2, further illustrates yet another example where motor 12 and motor 16 may be provided on each side of the transmission or on each side of a transmission element. In this example, one or more of motors 12 and 16 may be operated to supply or absorb torque from the driveline with or without torque being provided by the engine. Still other configurations are possible. As such, it should be appreciated that other suitable hybrid configurations or variations thereof may be used with regards to the approaches and methods described herein.

Note that in some embodiments, a propulsion system may not include one or more of the motors and energy storage device. For example, a propulsion system may include an engine as the only torque producing component without additional motors. Thus, FIG. 2 illustrates an example driveline of a vehicle propulsion system including a torque converter, transmission, and/or drive wheel for transmitting torque produced by the engine and/or motors to the ground surface.

FIG. 1 illustrates a schematic diagram showing a cylinder 30 of multi-cylinder engine 10, which may be included in a hybrid propulsion system described above with reference to FIG. 2. Engine 10 may be operated in either an Otto cycle or a Diesel cycle. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. However, other suitable input devices for controlling operation of the propulsion system may be used. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the vehicle via a transmission system (e.g. transmission 14). Further, a starter motor may be coupled to crankshaft 40 via a flywheel to enable a starting operation of engine 10 (e.g. motor 12).

Combustion chamber or cylinder 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. Further, controller 12 can be communicatively coupled to one or more of the components illustrated in FIG. 2 to enable the various control features described herein.

As described above, FIG. 1 shows only one cylinder of a multi-cylinder engine, and that each cylinder may similarly include its own set of intake/exhaust valves, fuel injector, spark plug, etc.

During some conditions, at least some cylinder of the engine may be operated in what may be referred to as a spark ignition (SI) combustion mode. During SI mode, fuel may be delivered to the cylinder, for example, via direct and/or port injection, where it may be ignited by a spark performed by a sparking device (e.g. spark plug 92).

During other conditions, at least some of the engine cylinders may be operated in what may be referred to as a homogeneous charge compression ignition (HCCI) mode. During HCCI mode, fuel may be delivered to the cylinder, for example, via direct and/or port injection, where it may be ignited by compression performed by the piston without necessarily requiring an ignition spark from the spark plug. This type of combustion may also be referred to as controlled auto-ignition (CAI) or premixed compression ignition.

During yet other conditions, at least some of the engine cylinders may be operated in what may be referred to as a stratified charge mode. During the stratified charge mode, fuel may be injected into the cylinder by direct injection in order to form a richer air/fuel region in the cylinder, while also maintaining a leaner air/fuel region in the cylinder upon combustion of the charge.

Each of the SI, HCCI, and stratified charge modes may be performed in engines that utilize an Otto cycle or a Diesel cycle. Furthermore, these modes may be selectively performed by the engine where the fuel combusted by the engine includes gasoline, diesel, or other suitable fuel. Thus, it should be appreciated that the various approaches described herein for reducing clunk may be applied to transitions between HCCI, SI, and stratified charge combustion modes where the engine operates in either an Otto or Diesel cycle.

HCCI and stratified charge modes may be used to achieve greater fuel efficiency and/or reduced emissions over SI mode, at least during some conditions. As one example, combustion via HCCI can be achieved with a substantially leaner mixture of air and fuel (e.g. having a greater ratio of air to fuel than stoichiometry) than may be necessarily utilized during SI mode. However, during some conditions, such as at high or low engine load or speed, it may be difficult to achieve reliable combustion in HCCI mode. In contrast, SI mode may be used across a more broad range of operating conditions, since the timing of combustion may be controlled by the timing of a spark. As such, one or more cylinders of the engine may be transitioned between SI mode and HCCI mode in response to engine operating conditions. For example, all of the engine cylinders may be transitioned between SI mode and HCCI mode or stratified charge mode by a substantially simultaneous transition of all cylinders (e.g. with respect to the firing order) or the transition may be staged over a pre-determined transition period, where some of the cylinders may be transitioned while other cylinders of the engine refrain from transitioning until one or more cycles have elapsed. As another example, only part of the cylinders may be transitioned between SI mode and HCCI mode or stratified charge mode, while part of the cylinders remain in the same mode.

Figure 3:
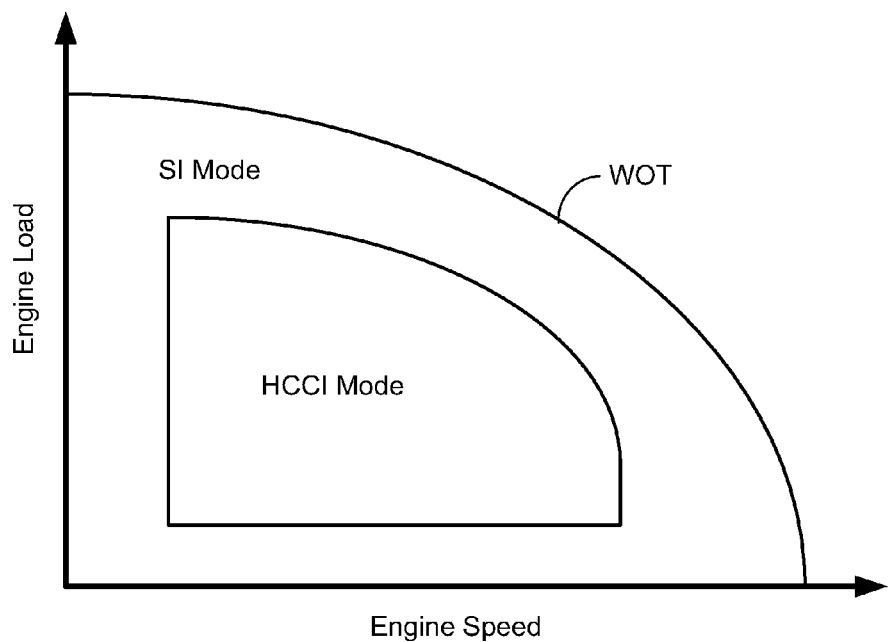
FIG. 3 illustrates an example mode map for selecting an operating mode.

FIG. 3 illustrates an example mode map that may be used by the control system to determine a suitable operating mode for the engine or a portion of the cylinders thereof. In particular, FIG. 3 provides a comparison between the operating mode with engine operating conditions including speed and load. Further, the wide open throttle (WOT) envelope is provided, which is indicative of the maximum output that may be achieved by the engine. In this particular example, the region where HCCI mode may be utilized is represented as a window occupying a central region of the area defined by the WOT curve. The HCCI mode region is surrounded by the SI region. Thus, HCCI mode may be utilized during some conditions, such intermediate engine speed and/or load, while SI mode may be utilized during higher or lower engine speed or load conditions. While not illustrated in FIG. 3, the stratified charge mode may also include a specified region within the SI region.

As one approach, the operating mode may be selected on a per cylinder basis based on the operating conditions of the particular cylinder, or the operating mode may be selected for a group of cylinders based on operating conditions of the group. For example, one of the HCCI, stratified charge, and SI modes may be assigned to each of the cylinders based on the mode map of FIG. 3. If the identified conditions of the cylinder or engine reside within the SI mode region, then the engine or a cylinder thereof may be operated in SI mode. Alternatively, if the identified conditions reside within the HCCI mode region, then the engine or a cylinder thereof may be operated in HCCI mode.

Transitions between modes may be performed where the operating condition approaches a boundary of a particular operating region or where the control system predicts that a future operating condition may reside in a region outside of the current operating mode. In this way, advantages of each operating mode may be achieved while maintaining reliable combustion. It should be appreciated that FIG. 3 provides just one example of a transition mode map, and that other maps are possible.

While the use of a spark is not necessarily required during HCCI mode, a spark may be used, during some conditions, to assist initiate auto-ignition of the air and fuel charge within the combustion chamber. This type of operation may be referred to as a spark assist mode of operation. In some conditions, spark assist may be used to facilitate auto-ignition timing control in HCCI mode, however, it should be appreciated that the application of spark assist may result in reduced efficiency and/or emission quality as compared to unassisted HCCI modes.

Figure 4:
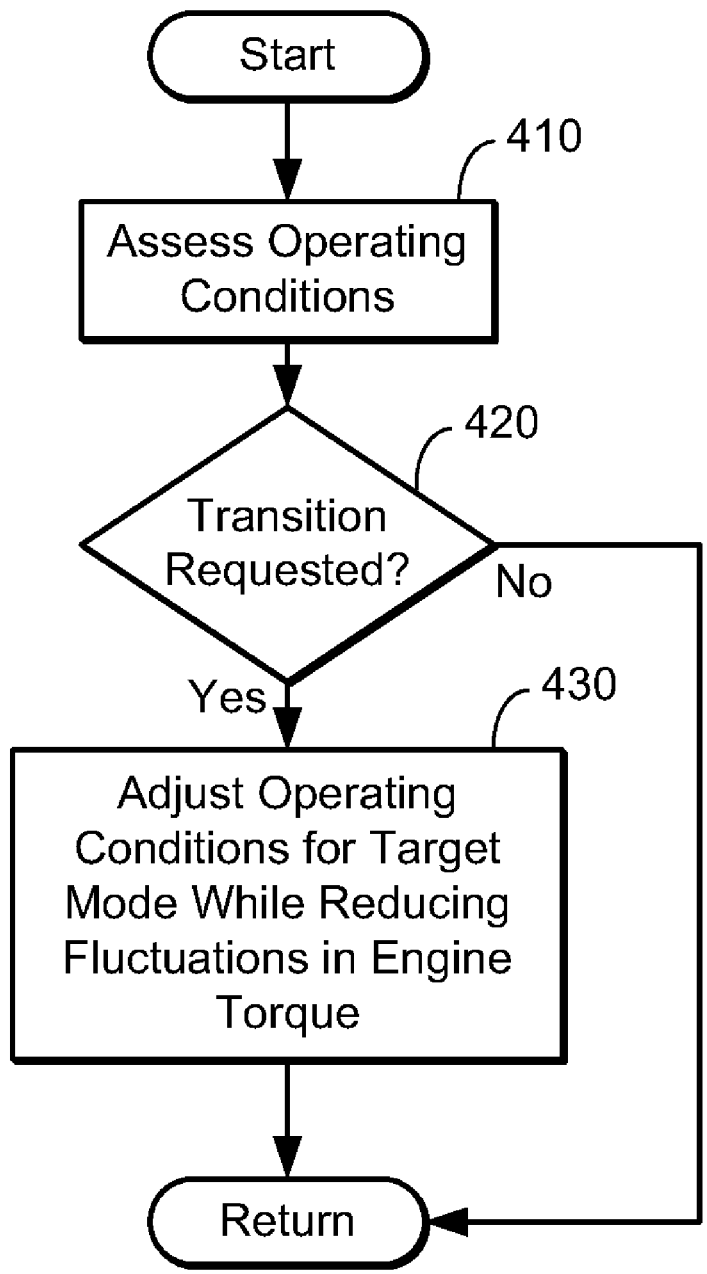
FIG. 4 is a flow chart illustrating an example transition control strategy.

FIG. 4 illustrates an example routine that may be performed by the vehicle control system (e.g. controller 12) for facilitating a mode transition. The routine may assess operating conditions of the vehicle at 410, where operating conditions may include one or more of the following: valve timing, spark time, fuel injection amount and/or timing, turbocharging, exhaust gas recirculation, state of charge (SOC) of the energy storage device, motor conditions such as temperature, output or input, transmission conditions, torque converter conditions, engine speed, engine load, cylinder mode conditions, vehicle operator inputs, ambient conditions, among others and combinations thereof.

At 420, it may be judged whether a transition is requested. As described above with reference to FIG. 3, the control system may utilize one or more mode maps for selecting a suitable mode for the engine cylinders based on one or more of the operating conditions assessed at 410. If the answer at 420 is no, the routine may return. Alternatively, if the answer at 420 is yes, the control system may adjust, at 430, one or more operating conditions of the engine to achieve the requested transition to the target mode. For example, the engine may transition one or more cylinders of the engine from SI mode to HCCI mode, or from HCCI mode to SI mode. Alternatively, transitions may be performed between SI mode and stratified charge mode, or HCCI mode and stratified charge mode. Further, it should be appreciated that other modes may be possible, depending on the type of engine. As one example, one or more cylinder may be deactivated or initiated. The operating conditions may be adjusted so that the fluctuation of engine out torque is reduced. Finally, the routine may return.

While transitions between combustion modes may be used to achieve improved efficiency while also meeting the performance demands of the vehicle operator, some transitions may cause undesirable noise and vibration harshness (NVH). As one example, torque fluctuations resulting from the transition of one or more cylinders between HCCI mode and SI mode may lead to what may be referred to as "clunk", which may be caused by lash in the transmission.

Figure 5:
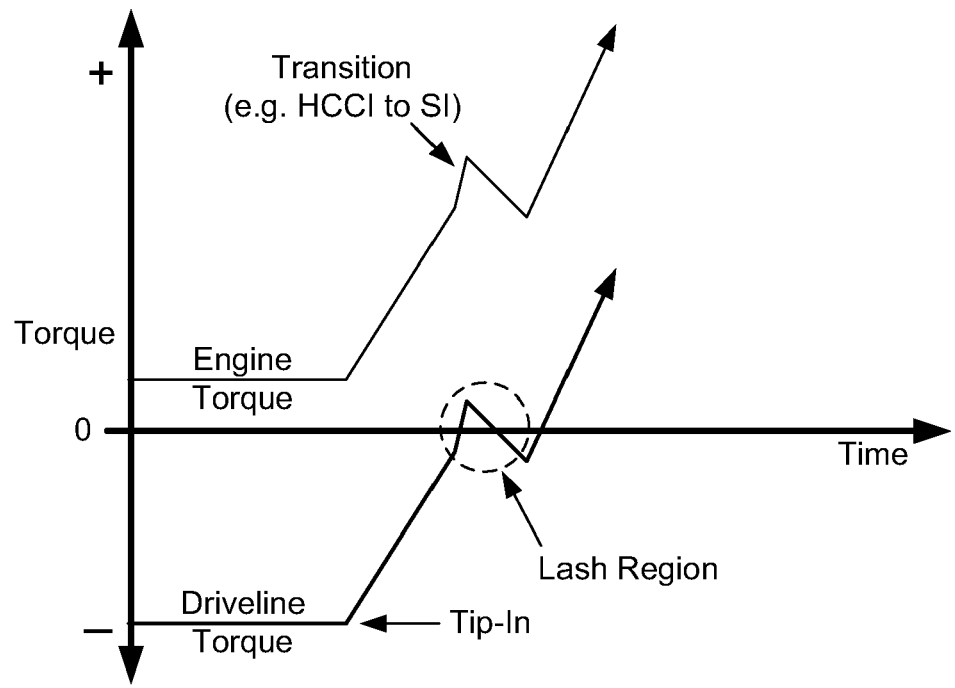
FIGS. 5-7 illustrate example torque management scenarios.

As described above, in at least one example, an approach is described for enabling transitions between combustion modes with reduced transmission NVH, while also meeting the torque request of the vehicle operator. FIG. 5 is a graph illustrating how the engine torque transmitted through the driveline may vary with time during an example operating cycle. During conditions where the driveline torque approaches zero, such as where the torque in the driveline begins to transition between the positive and negative torque regions, the driveline elements transition through their lash region (neglecting acceleration and other effects). For example, as illustrated by FIG. 5, where the driveline torque is initially negative and the driver tips in via the accelerator pedal (i.e. increases the requested torque), one or more cylinders may be transitioned to a different combustion mode in response to a mode map, for example, as illustrated in FIG. 3. As one example, one or more cylinders may transition from HCCI or stratified charge mode to SI mode to enable the engine to meet the increase in requested torque.

As described above with reference to FIG. 4, transitions between combustion modes may include the adjustment of one or more operating conditions such as valve timing, spark timing, fuel injection amount and/or timing, among other conditions. Even where the appropriate adjustment of engine operating conditions are coordinated to reduce torque transients across the transition, there may nevertheless be some momentary fluctuation (e.g. increase and/or decrease) in the torque total produced by the engine. Further still, where the engine may be assisted by one or more motors (e.g. in the case of an HEV), the addition or subtraction of torque by the motor may also cause a momentary torque transient. These torque transients may be dampened by one or more elements of the transmission (e.g. torque converter), however, where the driveline torque is passing through the lash region of the transmission (e.g. between positive and negative torque), an objectionable "clunk" or other NVH may be generated if the impact velocity of the driveline elements is too rapid. For example, as illustrated in FIG. 5, a mode transition of one or more engine cylinders may cause a corresponding torque fluctuation in the driveline, which may cause clunk or other NVH if the fluctuation occurs within the lash region as illustrated in FIG. 5.

In an automatic transmission vehicle, positive torque may be produced by the torque converter and transmitted to the driveline when the input speed including at least one of the engine speed or motor speed (e.g. motor 12) is above turbine speed and the turbine speed is at the synchronous turbine speed (when the torque converter is unlocked—when it is locked or partially locked, torque may be transmitted through the lock-up clutch). (The torque converter speed ratio (turbine speed/engine speed) is less than 1.0 when positive torque is being delivered). If a torque disturbance occurs during the transition from speed ratios >1 to <1, then the engine and/or motor can accelerate too fast through this region (beginning to produce positive torque) resulting in a higher rise rate of output shaft torque accelerating the elements in the driveline. Higher torque levels before the lash in the driveline being taken up can then produce higher impact velocities and make "clunk" more likely.

Figure 6:
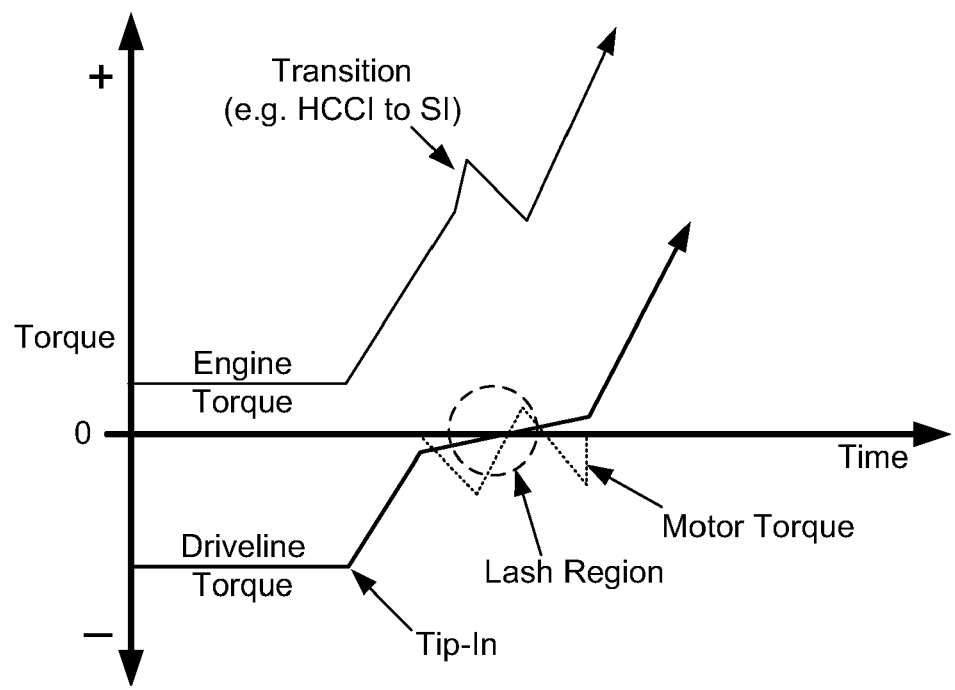
Figure 7:
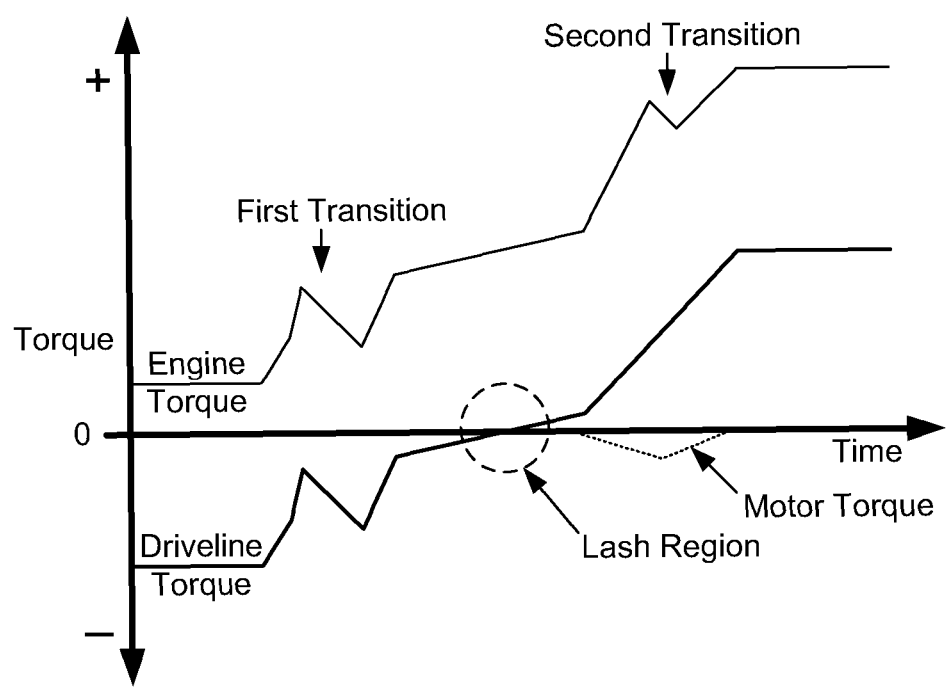

At least two approaches may be used to reduce transmission clunk or other NVH of the driveline where mode transitions of one or more cylinders are used or where a motor is used to assist the engine in the case of a hybrid propulsion system. As a first approach, one or more motors transmitting torque to the driveline may be operated to smooth the torque transients caused by a combustion mode transition of at least one cylinder of the engine as illustrated in FIG. 6. As a second approach, mode transitions may be scheduled to occur outside of the transmission lash region with or without assistance from a motor as illustrated in FIG. 7. It should be appreciated that the first approach and the second approach may be used together or exclusively to achieve improved drivability performance.

As illustrated in FIG. 6, the driveline torque after tip-in follows the engine torque as it approaches the lash region, where the motor torque may be operated to control the rate of torque change through the lash region and to reduce fluctuations in the combined torque supplied to the drive line by the engine and motor. In this particular example, the motor supplies and absorbs torque through the lash region and/or during an engine transition so that the rate of change of driveline torque may be controlled in a manner that reduces clunk and/or other driveline NVH. In this particular example, torque absorbed by the motor may be stored in the energy storage device while torque may be supplied by the motor from energy supplied from the energy storage device.

As illustrated in FIG. 7, the drive line torque after tip-in follows the engine torque as it approaches a lash region. Before reaching the lash region a first transition of the engine may be performed with or without assistance from the motor. In this particular example, no motor assistance has been used, so the driveline torque follows the engine torque. After passing through the lash region, a second transition may be performed, again outside of the lash region, while motor torque may be applied to smooth torque transients in the driveline torque caused by the second transition of the engine. In this particular example, the motor absorbs torque and converts the absorbed torque to energy storable by the energy storage device.

Figure 8:
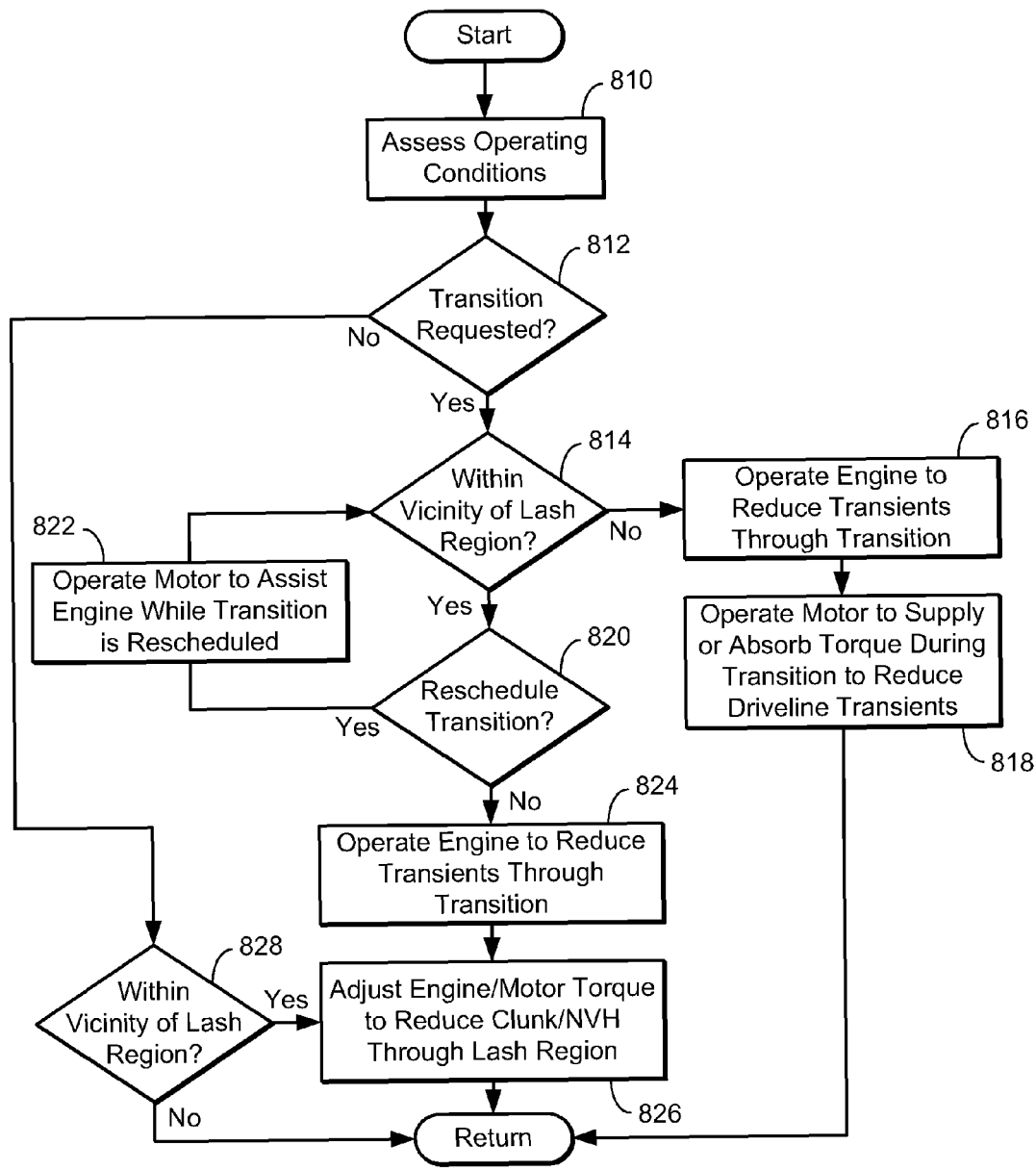
FIGS. 8 and 9 are flow charts illustrating example torque control strategies for the engine and/or motor of the vehicle propulsion system.

FIG. 8 illustrates an example routine that may be performed by the vehicle control system for reducing transmission clunk or other NVH, for example, as described above with reference to FIGS. 6 and 7. At 810, the control system may assess the operating conditions of the vehicle, for example, as described above with reference to 410. At 812, it may be judged whether a transition is requested. If the answer is yes, it may be judged whether the current driveline torque is within the vicinity of the lash region. Note that the lash region may be identified using one or more approaches. As one example, the lash region may be identified by comparing the speed ratio of the input speed and output speed of the torque converter as will be described in FIG. 9. As another example, information relating to the lash region or conditions where lash may be encountered as well as information relating to the stiffness of the transmission and driveline may be based on statistical data from testing of the transmission or similar transmissions. If the answer at 814 is no, one or more cylinders of the engine may be transitioned while the engine is operated to reduce transients caused by the transition at 816. At 818, the motor may be operated in coordination with the engine by supplying or absorbing torque of the driveline to further reduce torque transients during at least the engine transition.

Alternatively, if the answer at 814 is yes, it may be judged at 820 whether the transition is to be rescheduled so that the transition is not performed within the lash region. If the answer is yes, the motor may be operated at 822 to assist the engine meet the torque request by the vehicle operator while the transition is rescheduled (e.g. delayed). As one example, the motor may assist the engine or at least a cylinder thereof remain in a particular operating mode such as HCCI, where otherwise the engine may be transitioned to SI mode. Alternatively, if the answer at 820 is no, the engine may be operated at 824 to reduce transients through the transition and the engine and/or motor torque may be adjusted at 826 to reduce clunk or other NVH while operating within the lash region. For example, the rate of torque change may be controlled to be less than a threshold while within operating within the lash region, thereby reducing the level of clunk that may occur when the driveline torque changes from positive to negative. As another example, the motor may supply or absorb torque based on the torque produced by the engine to achieve a predetermined rate of change in the drive line torque while transitioning between the positive and negative torque regions.

Returning to 812, if the answer is no, it may be judged at 828 whether the driveline torque is within the vicinity of the lash region. If the answer is yes, the engine and/or motor torque may be adjusted to reduce clunk or other NVH while operating within the lash region. Note that the engine and/or motor torque may be adjusted in response to a torque-speed or a torque-time map or function, which may be at least partially dependent upon the stiffness of the transmission and the lash region identified, for example, at 814. Finally, from one of 828, 826, or 818, the routine may return.

As such, the lash regions described above may be identified using one or more approaches. As one approach, the lash region of the transmission may be identified based on statistical information relating to the lash regions of similar transmission types. Alternatively or additionally, an engine and/or motor torque estimation model may be used to identify the lash region or regions.

While an engine torque estimation model in the controller can be used, in some conditions, errors in the estimation can reduce estimate accuracy so that it may not reliably indicate whether the driveline torque is slightly positive or slightly negative. As such, another approach that can be used alone or in addition to a torque estimate, to accurately indicate when the driveline is passing through the lash region, even in the presence of external noise factors. One control approach is described with regard to FIG. 9. Specifically, the control system may use the torque converter speed ratio to infer the torque level in the driveline. If the speed ratio is >1, the transmission is deemed to not be producing positive torque. As described above, a fast rise in engine and/or motor torque occurring before the speed ratio is >1 by some margin can increase the risk of clunk. However, the level to which engine and/or motor torque can be managed relative to requested output is dependent on the vehicle performance requested by the driver, as indicated by accelerator pedal position, in one example. Further, since the level of torque multiplication in the transmission and vehicle speed may also affect the level of acceleration in the driveline and how perceptible a clunk might be to the customer, these factors can also be considered. Therefore, in one example, at least four inputs may be used to determine a maximum rise rate for engine torque, including: speed ratio, pedal position, vehicle speed and the ratio of the combined engine speed and/or motor speed to vehicle speed (novs). This rate may then be used to calculate a filtered version of the driver's requested torque (including one or more of the engine and motor) to avoid tip-in clunk, as described above. Note, however, that not all of these parameters are required, and various combinations, and sub-combinations, can be used.

Figure 9:
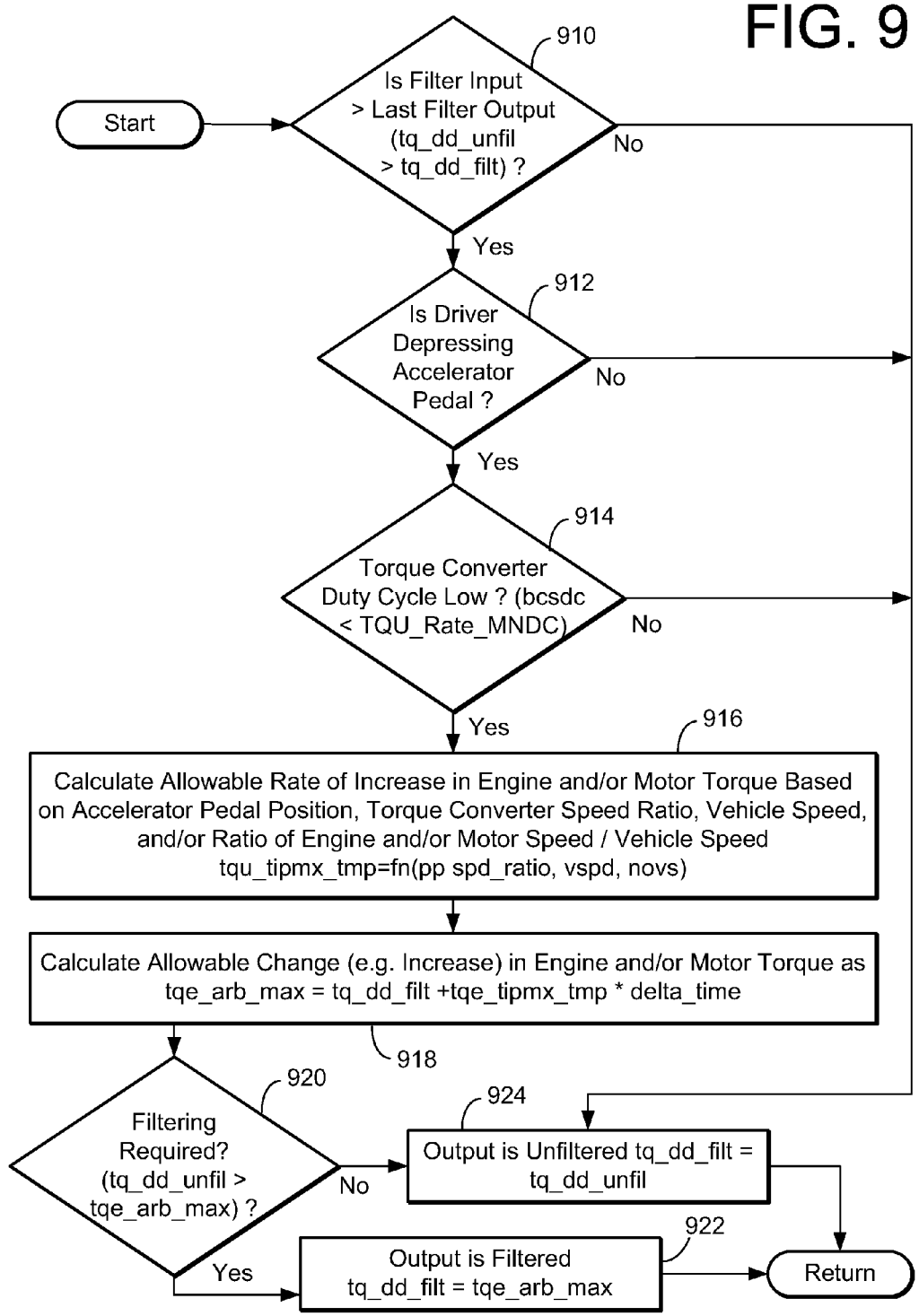

Referring now to FIG. 9, a routine is described for limiting the rate of change (e.g. increase) in engine and/or motor output or the type of mode transition permitted for one or more of the engine cylinders to reduce the risk of clunk. At 910, the routine determines whether the current filter output is greater than the last filter output (tq_dd_unfil>tq_dd_filt). When the answer at 910 is yes, the routine continues to 912. In step 912, where the routine determines whether the driver is depressing the accelerator pedal 130, for example, as measured by signal PP via sensor 134. In one example, the routine judges whether the driver is depressing the accelerator pedal by determining whether the pedal position is less than a pre-selected value. Note that this pre-selected value can be an adaptive parameter that tracks variations in the closed pedal position due to sensor aging, mechanical wear, and various other factors. When the answer to step 912 is yes, the routine continues to 914.

At 914, the routine determines whether the torque converter clutch duty cycle is low. In one example, the routine determines whether the commanded duty cycle (bcsdc) is less than a calibratable threshold value (TQE_RATE_MNDC). Specifically, at 914, the routine can then determine whether the torque converter is in a locked or unlocked state. When the answer at 914 is yes, indicating that the torque converter is not locked or not substantially locked, the routine continues to 916.

At 916, the routine calculates an allowable rate of increase in engine and/or motor torque based on various factors. Specifically, the routine uses information that relates status and conditions of the engine and propulsion system indicative of whether clunk can affect drive feel, and whether rate limiting requested engine or motor torque will reduce vehicle response. In particular, in one example, the routine utilizes the sensed accelerator pedal position (PP), the torque converter speed ratio, the vehicle speed, the ratio of vehicle speed to engine and/or motor speed, and information relating to the particular mode of operation of each of the cylinders. In one example, the allowable rate of increase (tqe_tipmx_tmp) is determined as a four dimensional function of the pedal position, speed ratio, vehicle speed, and combined engine and motor speed to vehicle speed ratio. In another example, the calculation as illustrated in FIG. 4 can be utilized with two dimensional look up tables. The first look up table can use the ratio of engine and/or motor speed to vehicle speed, and torque converter speed ratio as inputs, while the second table can use pedal position and vehicle speed as inputs, with the results of the two look up tables being multiplied together to provide the allowable rate of increase in the combine engine and/or motor torque transmitted through the transmission.

Continuing with FIG. 9, at 918, the routine calculates the allowable increase in engine and/or motor torque (tqe_arb_max) as the sum of the filtered torque input value (tq_dd_filt) and the product of the maximum allowable rate of increase times the sample time (delta_time). Next, at 920, the routine determines whether filtering is to be used by checking whether the unfiltered requested torque is greater than the allowable increase in combined engine and/or motor torque calculated at 915.

When the answer at 920 is yes, the output is filtered by setting the filtered output torque used to control engine operation as equal to the maximum allowable torque calculated at 918. Alternatively, when the answer at 920 is no, the routine continues to 924 and uses the unfiltered output as the torque used to control engine and/or motor operation. Note that the output of the routine of FIG. 9 (tq_dd_filt), which represents the rate limited requested torque to be produced, can then be used to carry out various engine and/or motor operations. Specifically, this last value is utilized to schedule control actions such as, for example: controlling the throttle position of an electronically controlled throttle, adjusting the amount of torque absorbed or provided by the motor to the driveline (e.g. on the engine side of the transmission and/or on the drive wheel side of the transmission), controlling or scheduling transitions between cylinder modes (e.g. advancing, executing, or delaying transitions), controlling fuel injection of the fuel injectors, controlling ignition timing of the engine, and various other parameters. In this way, the engine and/or motor can be controlled to provide the requested filter torque, thereby reducing clunk while still providing acceptable and responsive vehicle operation.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method for controlling a vehicle propulsion system including a transmission including a lash region coupling an engine output shaft to a vehicle drive wheel, comprising:
    adjusting an operating parameter of the engine so that at least one cylinder of the engine is transitioned between a first combustion mode and a second combustion mode; and
    varying a timing of said transition responsive to whether the transmission is operating within the lash region of the transmission.

2. The method of claim 1, further comprising, adjusting an amount of torque provided to the transmission by the engine as said transmission approaches the lash region.

3. The method of claim 2, wherein said adjusting the amount of torque includes reducing the amount of torque provided to the transmission by the engine as said transmission approaches the lash region.

4. The method of claim 1, wherein said timing of the said transition is advanced so that the transition is performed before the transmission passes through said lash region.

5. The method of claim 1, wherein said timing of the said transition is retarded so that the transition is performed after the transmission passes through said lash region.

6. The method of claim 1, wherein said propulsion system includes an electric motor coupled to said transmission and wherein the method further comprises adjusting an amount of torque provided to the transmission by the motor in response to said timing of said transition.

7. The method of claim 1, wherein said propulsion system includes an electric motor coupled to the drive wheel and wherein the method further comprises adjusting an amount of torque exchanged between the motor and the drive wheel as said transmission approaches the lash region.

8. The method of claim 1, wherein the first mode is a spark ignition mode and the second mode is a homogeneous charge compression ignition mode.

* * * * *